(12) United States Patent
Tanaka et al.

(10) Patent No.: US 7,204,148 B2
(45) Date of Patent: Apr. 17, 2007

(54) ACOUSTIC WAVE TOUCH DETECTING APPARATUS

(75) Inventors: Yoshikazu Tanaka, Yokohama (JP); Joel Kent, Fremont, CA (US); James Roney, Fremont, CA (US)

(73) Assignee: Tyco Electronics Corporation, Middletown, PA (US)

( * ) Notice: Subject to any disclaimer, the term of this patent is extended or adjusted under 35 U.S.C. 154(b) by 58 days.

(21) Appl. No.: 10/712,874

(22) Filed: Nov. 12, 2003

(65) Prior Publication Data

US 2005/0156911 A1 Jul. 21, 2005

(30) Foreign Application Priority Data

Nov. 13, 2002 (JP) ............................. 2002-329479

(51) Int. Cl.
  *G01N 29/036* (2006.01)
  *G09G 5/00* (2006.01)
  *G06F 3/033* (2006.01)
  *G01H 11/06* (2006.01)
(52) U.S. Cl. ......................... 73/649; 73/606; 345/177; 178/18.04; 310/313 R
(58) Field of Classification Search ................. 73/649, 73/606; 345/175, 177, 173; 178/18.04, 178/18.02, 18.09, 18.01; 310/313 R
See application file for complete search history.

(56) References Cited

U.S. PATENT DOCUMENTS

| | | | |
|---|---|---|---|
| 5,177,327 A | 1/1993 | Knowles et al. ............... | 178/18 |
| 5,241,308 A | 8/1993 | Young | |
| 5,260,913 A * | 11/1993 | Kadota et al. ............... | 367/140 |
| 5,329,070 A * | 7/1994 | Knowles .................. | 178/18.04 |
| 5,591,945 A * | 1/1997 | Kent ........................ | 178/18.04 |
| 5,648,643 A * | 7/1997 | Knowles et al. ......... | 178/18.04 |
| 5,673,041 A * | 9/1997 | Chatigny et al. ............. | 341/22 |
| 5,739,479 A | 4/1998 | Davis-Cannon et al. | |

(Continued)

FOREIGN PATENT DOCUMENTS

EP    0190734 A    8/1986

(Continued)

OTHER PUBLICATIONS

International Search Report for International Application No. PCT/JP03/14322, mailed Jan. 13, 2004.

(Continued)

*Primary Examiner*—Hezron Williams
*Assistant Examiner*—Jacques Saint-Surin

(57) ABSTRACT

Two groups of inclined lines, which are included in a spurious wave scattering means, are formed at opposite angles with respect to each other in the vicinity of an upper edge of a substrate. The angles of the inclined lines are such that they are close to perpendicular toward the central portion of the substrate, and gradually decrease toward the edges thereof. In a similar manner, two other groups inclined lines, which are also included in the spurious wave scattering means, are formed at opposite angles with respect to each other, with gradually changing angles. The spurious waves that reach these regions are diffuse by the inclined lines, so that they are not propagated to converters (sensors). Three rectangular spurious wave scattering means, formed by inclined lines, inclined at angles other than 45°, also function to diffuse and eliminate spurious waves that propagate along the front surface of the substrate.

4 Claims, 11 Drawing Sheets

U.S. PATENT DOCUMENTS

| | | | |
|---|---|---|---|
| 6,078,315 A * | 6/2000 | Huang | 345/177 |
| 6,091,406 A | 7/2000 | Kambara et al. | |
| 6,313,829 B1 | 11/2001 | Tolt et al. | 345/177 |
| 6,406,990 B1 | 6/2002 | Kawai | |
| 6,567,077 B2 | 5/2003 | Inoue et al. | |
| 6,741,237 B1 * | 5/2004 | Benard et al. | 345/173 |
| 6,765,274 B2 | 7/2004 | Honda | |
| 6,871,149 B2 * | 3/2005 | Sullivan et al. | 702/56 |
| 2001/0026399 A1 * | 10/2001 | Tanaka et al. | 310/313 |
| 2002/0008692 A1 | 1/2002 | Omura et al. | |
| 2003/0164820 A1 | 9/2003 | Kent et al. | 345/177 |
| 2005/0035685 A1 * | 2/2005 | Nakabayashi et al. | 359/576 |

FOREIGN PATENT DOCUMENTS

| | | |
|---|---|---|
| JP | 61-239322 A | 12/1986 |
| JP | 6-082301 A | 3/1994 |
| JP | 6-324792 A | 11/1994 |
| JP | 9-152938 A | 6/1997 |
| JP | 2000-43484 A | 2/2000 |
| JP | 2001-14094 A | 1/2001 |
| WO | WO 98/07127 A1 | 2/1998 |
| WO | WO 01/93189 A2 | 12/2001 |
| WO | WO2004/044726 A | 5/2004 |

OTHER PUBLICATIONS

Partial International Search Report for International Application No. PCT/US2004/037492.

Patent Abstracts of Japan, vol. 2003, No. 12, Dec. 5, 2003 (abstract of JP 2004-163262).

* cited by examiner

ACOUSTIC WAVE TOUCH DETECTING APPARATUS

BACKGROUND OF THE INVENTION

1. Field of the Invention

The present invention relates to an acoustic wave contact detecting apparatus, such as an ultrasonic touch panel.

2. Description of the Related Art

Ultrasonic acoustic wave contact detecting apparatuses are in widespread use. Examples of their applications include operating screens of personal computers, ticket dispensers at train stations, copiers installed in convenience stores, and ATM's at financial institutions. These acoustic wave contact detecting apparatuses utilize transducers, including piezoelectric vibrators (piezoelectric elements) provided on a substrate (touch panel) formed of glass or the like. These transducers function both as generating means for bulk waves and as sensors for detecting acoustic waves which are scattered by a finger or the like that contacts the touch panel. The surface acoustic waves are scattered by a finger or the like. The scattering of the surface acoustic waves is detected by detection means. The detected signal is referenced against a clock signal of a controller, and the position at which the surface acoustic waves are scattered is determined.

Ultrasonic vibrations, which are generated as bulk waves, are converted to surface acoustic waves by acoustic wave generating means, and are propagated along the substrate.

When the bulk waves are converted to surface acoustic waves by the acoustic wave generating means, not all of the bulk waves are converted. Spurious waves, including unconverted bulk waves, surface acoustic waves which have passed through a reflection array, and surface acoustic waves which are reflected in directions other than predetermined directions, are generated. If these spurious waves are reflected along the substrate and reach the sensor side converters, they cause these converters to vibrate and generate voltages. These voltages are received as noise, and throw off proper judgment by the controller.

For this reason, vibration insulating or vibration absorbing materials are provided on the substrate to absorb the generated spurious waves (disclosed, for example, in Japanese Unexamined Patent Publication Nos. 6 (1994)-324792 (page 2, FIG. 1) and 61 (1986)-239322 (page 11, FIG. 2)). These vibration insulating and vibration absorbing materials are normally in the form of resin tape, which is adhesively attached to the substrate. The spurious waves which reach the tape are absorbed and attenuated.

In the conventional art, it is necessary to adhesively attach the vibration insulation or vibration absorbing member to the substrate. The adhesive attachment operation is manually performed, therefore increasing the manufacturing steps and reducing productivity. As a result, there is a problem that manufacturing costs are increased.

SUMMARY OF THE INVENTION

The present invention has been developed in view of the above points. It is an object of the present invention to provide an acoustic wave contact detecting apparatus, which is capable of effectively scattering and eliminating spurious waves, with increased productivity and reduced manufacturing costs.

The acoustic wave contact detecting apparatus of the present invention comprises:

a substrate having a surface along which acoustic waves propagate;

an acoustic wave generating means;

a reflection array for causing the generated acoustic waves to propagate along the surface of the substrate;

a detector for detecting changes in the acoustic wave caused by an object contacting the surface of the substrate; and a controller for determining the geometric coordinates of the object; wherein:

a spurious wave scattering means for diffusing spurious waves, which are generated accompanying the generation of the acoustic waves, is formed on the substrate.

A construction may be adopted wherein the spurious wave scattering means comprises a reflection array formed of the same material as that of the substrate.

The acoustic wave generating means and the spurious wave scattering means may be formed either by printing or etching.

Here, the "acoustic waves" include ultrasonic waves that propagate within a thin substrate along the surface thereof, in addition to surface acoustic waves that propagate along the surface of the substrate.

The acoustic wave generating means may include a mode converting element and an ultrasonic vibrator.

The detector may be a converter. The converter is an element that converts ultrasonic vibrations to electric signals, or an element that converts electric signals to ultrasonic vibrations.

The spurious wave scattering means may be a diffusion grating.

In the acoustic wave contact detecting apparatus of the present invention, a spurious wave scattering means for diffusing spurious waves, which are generated accompanying the generation of acoustic waves, is formed on the substrate. Therefore, the spurious waves are enabled to be effectively scattered by the spurious wave scattering means.

A construction may be adopted wherein the spurious wave scattering means comprises a reflection array formed of the same material as that of the substrate. In this case, the spurious waves are enabled to be scattered effectively.

The acoustic wave generating means and the spurious wave scattering means may be formed by printing. In this case, the productivity is increased and the manufacturing costs are reduced, because efficient production is enabled by automated printing, in addition to enabling effective scattering of spurious waves. The acoustic wave generating means and the spurious wave scattering means may alternatively be formed by etching. In this case also, productivity is increased and the manufacturing costs are reduced, because a single method can be used for forming both means, in addition to enabling effective scattering of spurious waves.

DESCRIPTION OF THE PREFERRED EMBODIMENTS

Preferred embodiments of the acoustic wave contact detecting apparatus (hereinafter, simply referred to as "apparatus") will be described with reference to the attached drawings.

Figure 1:
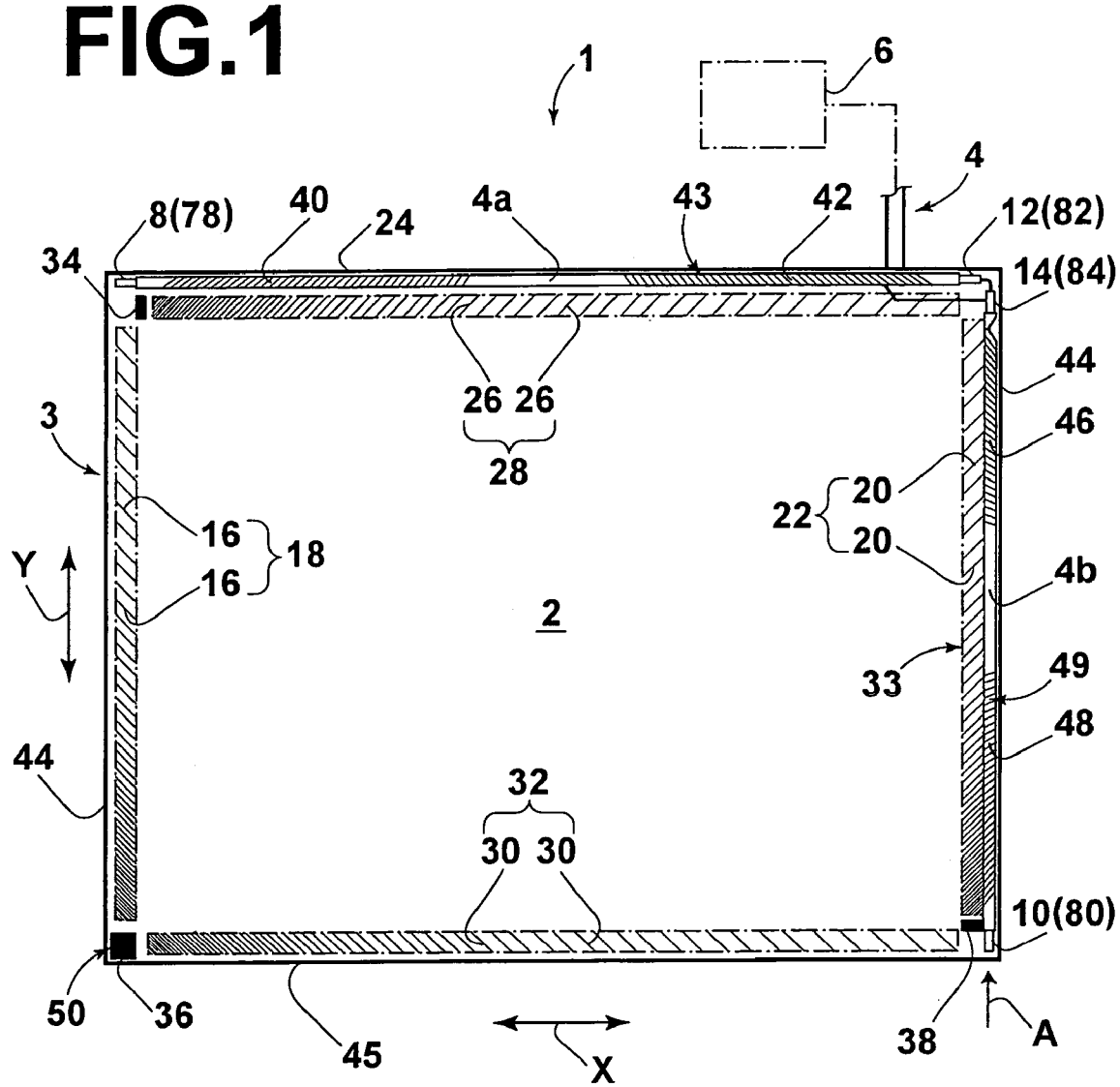
FIG. 1 is a front view of a touch panel, to be utilized in an acoustic wave contact detecting apparatus of the present invention.

FIG. 1 is a front view of a touch panel 3, to be utilized in an apparatus 1. As shown in FIG. 1, the touch panel 3 comprises: a substrate 2 formed by a rectangular glass plate; a Flexible Printed Circuit 4 (FPC) mounted on the substrate 2; and a controller 6, which is electrically linked to the FPC 4.

The FPC 4 is branched into an FPC branch 4a and an FPC branch 4b. The FPC branch 4a extends along the horizontal direction of the substrate 2, that is, the X axis direction indicated by the arrow X. The FPC branch 4b extends along the vertical direction of the substrate perpendicular to the X axis, that is, the Y axis direction indicated by the arrow Y. Converters (bulk wave generating means) 8 and 10 for generating ultrasonic waves are mounted on the FPC 4. In addition, converters (detectors) 12 and 14, which function as sensors, are mounted on the FPC 4.

A reflection array 18, comprising a great number of inclined lines 16, is formed along the Y axis on the front surface of the substrate 2, in the vicinity of one lateral edge 44 thereof. A reflection array 22, comprising a great number of inclined lines 20, is formed to face the reflection array 18, at the other lateral edge 44 of the substrate. A reflection array 28, comprising a great number of inclined lines 26, is formed along the X axis in the vicinity of the upper edge 24 of the substrate 2. A reflection array 32, comprising a great number of inclined lines 30, is formed to face the reflection array 28, in the vicinity of the lower edge 45 of the substrate. The patterns of these reflection arrays 18, 22, 28, and 32 are those disclosed in Japanese Unexamined Patent Publication Nos. 61 (1986)-239322 and 2001-14094. Note that the reflection arrays 18, 22, 28, and 32 will collectively be referred to as a reflection array 33. The reflection array 33 reflects acoustic waves, and causes them to propagate along the front surface of the substrate 2.

Figure 11:
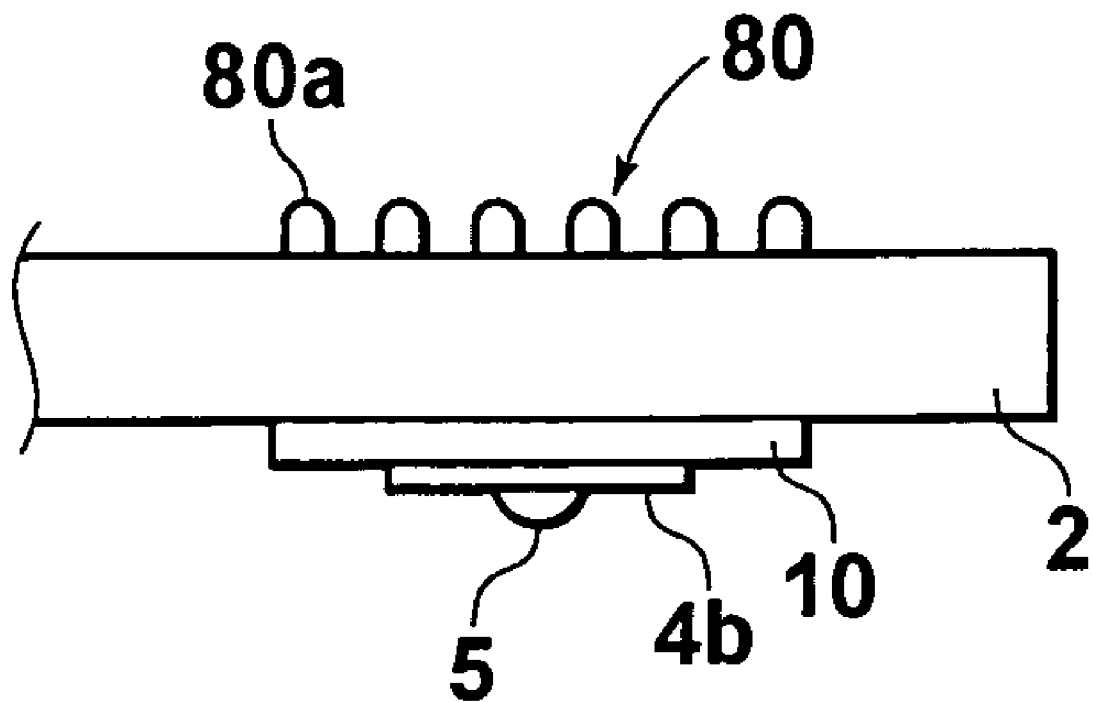
FIG. 11 is a schematic partial magnified view of the substrate of FIG. 1, viewed from the direction of arrow A.

The converters 8, 10, 12, and 14 are adhesively attached to the rear surface of the substrate 2. Mode converting elements 78, 80, 82, and 84 (grating) are formed on the front surface of the substrate 2, at positions corresponding to the converters 8, 10, 12, and 14, respectively. This construction will be described with reference to FIG. 11, taking the mode converting element 80 as an example. FIG. 11 is a schematic partially magnified view of the substrate 2, viewed from the direction of arrow A. The mode converting element 80 of FIG. 11 is formed by sintering glass paste on the substrate 2, and comprises a plurality of parallel ridges 80a. The ridges 80a shown in FIG. 11 extend in the direction perpendicular to the surface of the drawing sheet.

The widths of the ridges 80a are set to be 400 μm, and the heights are set to be 35 μm or greater. The direction in which the bulk waves are reflected is changed by varying the intervals among the ridges 80a. In the present embodiment, the ridges 80a are formed with intervals that cause surface acoustic waves to be generated directly beside the ridges 80a. The converter 10 is adhesively attached on the side of the substrate opposite the mode converting element 80, and is electrically connected to the FPC branch 4b with solder.

The other mode converting elements 78, 82, and 84 are of the same construction. Of these, the mode converting elements (acoustic wave generating means) denoted by reference numerals 78 and 80 convert bulk waves generated by the transmission side converters 8 and 10 into surface acoustic waves. The mode converting elements 82 and 84 convert the surface acoustic waves (acoustic waves) which have propagated along the front surface of the substrate 2 back into bulk waves.

The converter 10 generates ultrasonic vibrations (bulk waves) at a frequency of approximately 5.5 MHz. The ultrasonic vibrations travel through the interior of the substrate 2 from the rear surface thereof, and reach the mode converting element 80. The mode converting element 80 converts the ultrasonic vibrations to surface acoustic waves, which are propagated (reflected) perpendicular to the ridges 80a, toward the reflection array 32. The surface acoustic waves are reflected by the inwardly inclined lines 30 of the reflection array 32 and propagate along the front surface of the substrate 2 toward the reflection array 28 until they reach the inwardly inclined lines 26.

Bulk waves which are not converted to surface acoustic waves by the mode converting elements 78 and 80 are not radiated in a specific direction, but propagate in all directions from the mode converting elements 78 and 80. If a portion of the unconverted bulk waves are transmitted to the converters 12 and 14, they become spurious waves that obstruct primary signal detection. In addition, although the mode converting elements 78 and 80 are constructed to generate surface acoustic waves in a direction perpendicular to the ridges thereof, it is known that slight surface acoustic waves are generated in unintended directions. These surface acoustic waves may also become spurious waves that obstruct primary signal detection. If these spurious waves reach the converters 12 and 14, noise signals are generated thereat.

The surface acoustic waves that reach the reflection array 28 are reflected thereby to propagate toward the mode converting element 84. The surface acoustic waves that reach the mode converting element 84 are converted to bulk waves thereby. The converted bulk waves are transmitted to the converter 14 on the rear surface of the substrate 2, which senses and converts the vibrations thereof to electrical signals.

In a similar manner, the ultrasonic vibrations (bulk waves) generated by the converter 8 are converted to surface acoustic waves by the mode converting element 78. Then, the surface acoustic waves reach the mode converting element 82 via the reflection array 18 and the reflection array 22. The surface acoustic waves are converted to bulk waves by the mode converting element 82, transmitted to the converter 14, which senses and converts them to electrical signals.

In this manner, the surface acoustic waves are propagated across the entire region of the front surface of the substrate 2 covered by the reflection arrays 18, 22, 28, and 32. Therefore, if a finger (object) contacts (touches) the substrate 2 within this region, the surface acoustic waves blocked by the finger disappear or are attenuated. The signal change accompanying the change in the surface acoustic waves is transmitted from the converters 12 and 14, which function as sensors, to a timing circuit (not shown) of the controller 6 connected thereto. The controller 6 determines the geometric coordinates of the position touched by the finger.

The surface acoustic waves are reflected by each of the inclined lines 16, 20, 26, and 30 of the reflection array 33. 0.5% to 1% of the surface acoustic waves that reach each of the inclined lines are reflected thereby. The remainder passes through and is transmitted to the adjacent inclined line, so that all of the inclined lines sequentially reflect the surface acoustic waves.

Spurious wave scattering means for reducing noise by diffusing spurious waves, that is, diffusion gratings (diffusing portions), are formed on the front surface of the substrate 2 of the apparatus 1. The diffusion gratings include the rectangular portions denoted by reference numerals 34, 36, and 38 in FIG. 1, a diffusion grating 43 formed by inclined lines 40 and 42 along the upper edge 24, and a diffusion grating 49 formed by inclined lines 46 and 48 along the lateral edge 44. The inclined lines 40, 42, 46, and 48 construct a second reflection array, having a function different from that of the reflection arrays 18, 22, 28, and 32. The second reflection array is also provided within the diffusion gratings 34, 36, and 38 (refer to FIG. 7). Details of the diffusion gratings 34, 36, 38, 43, and 49 will be described later. Note that the diffusion gratings will collectively be referred to as a diffusion grating 50.

Figure 2:
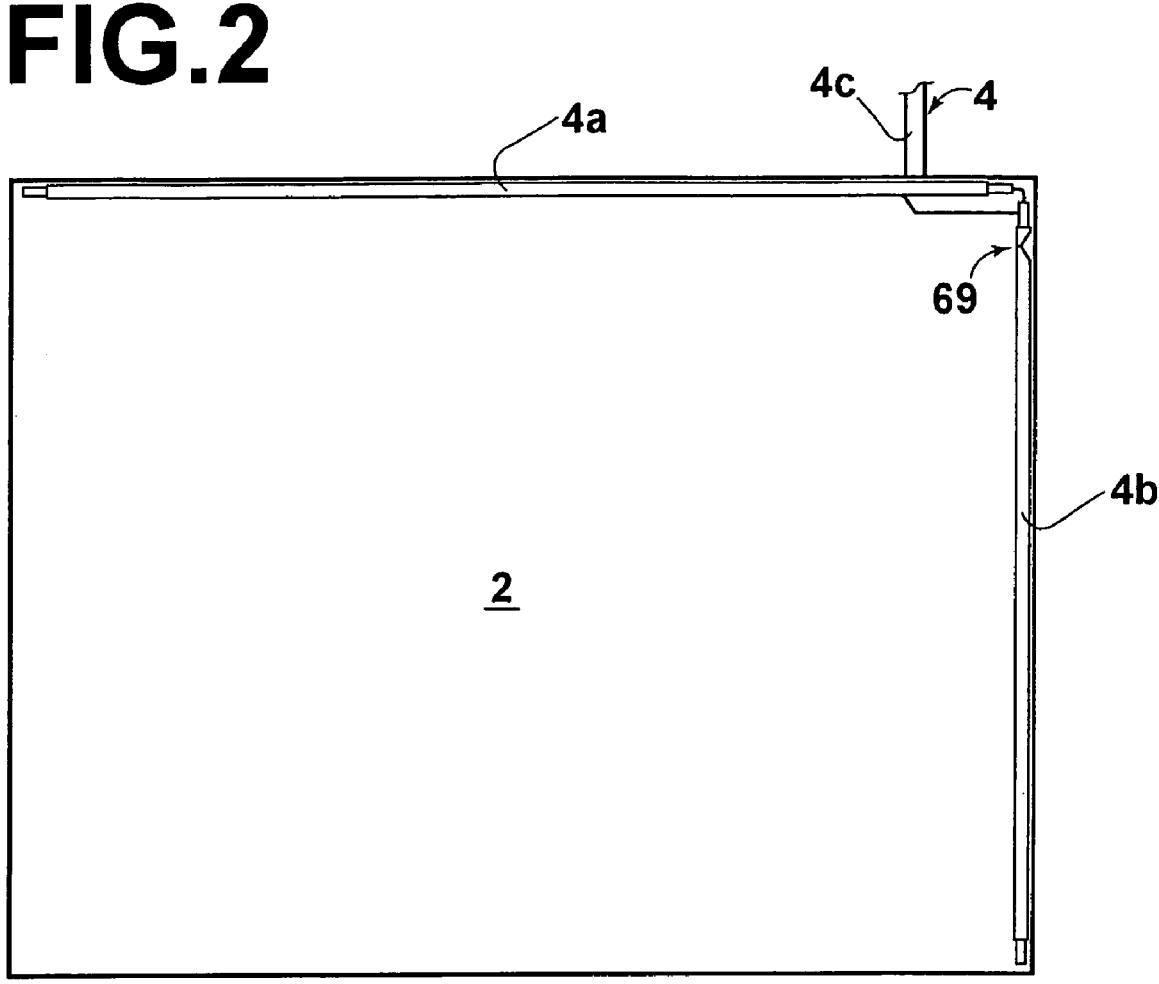
FIG. 2 is a front view illustrating an FPC which is attached to a substrate.
Figure 3:
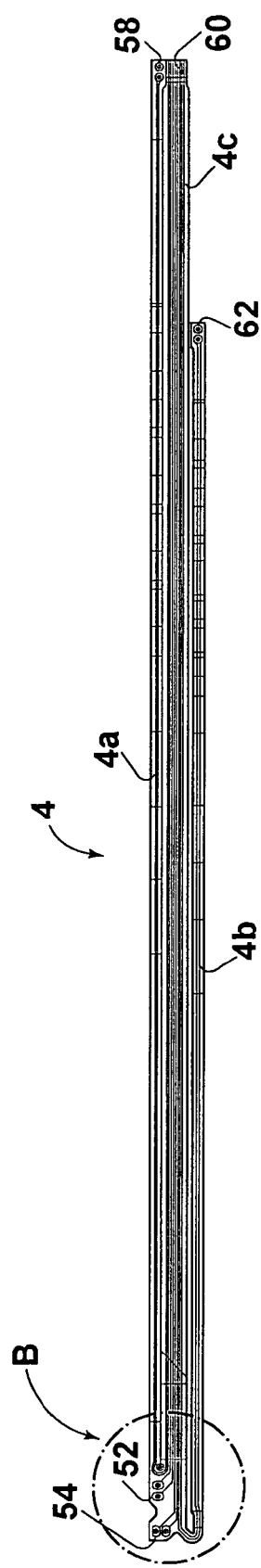
FIG. 3 is a schematic plan view showing the entirety of the FPC.
Figure 4:
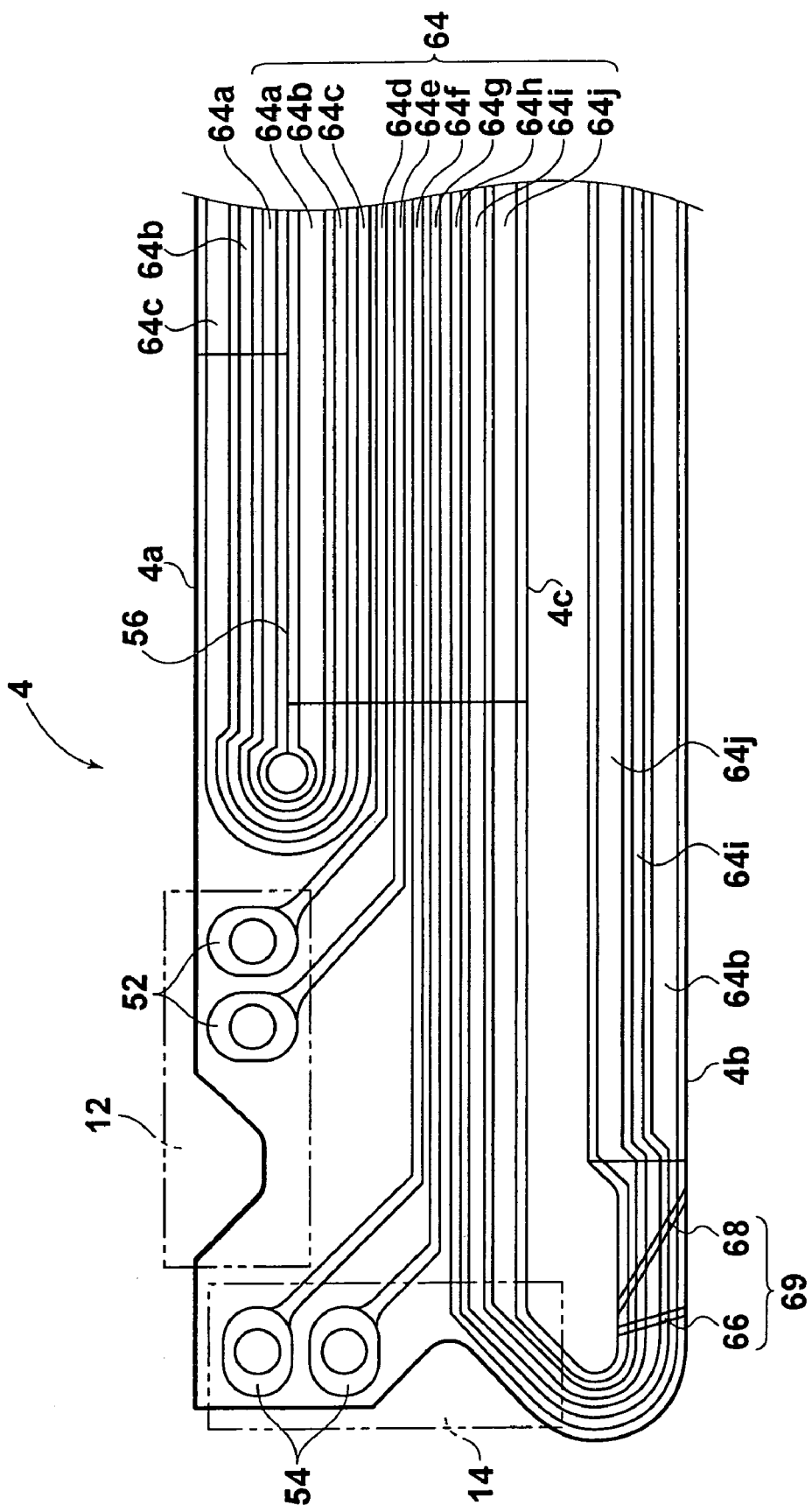
FIG. 4 is a magnified view of the portion of the FPC indicated by B in FIG. 3.

Next, the FPC 4, which is adhesively attached to the substrate 2, will be described with reference to FIG. 2, FIG. 3, and FIG. 4. FIG. 2 is a front view illustrating the FPC 4, which is attached to the substrate 2. Although the FPC 4 is adhesively attached to the rear surface of the substrate 2, it is drawn in solid lines for the sake of convenience. Note that the reflection array 33 and the diffusion grating 50 are omitted from FIG. 2. FIG. 3 is a schematic plan view showing the entirety of the FPC 4. FIG. 4 is a magnified view of the portion of the FPC 4 indicated by B in FIG. 3. The FPC 4 as shown in FIG. 3 and FIG. 4 correspond to a state in which it is viewed from the rear surface of the substrate 2 of FIG. 2.

Electrodes 52 and 54, corresponding respectively to the converters (sensors) 12 and 14, are provided at one end of the FPC 4, as shown in FIG. 3 and FIG. 4. The electrodes 52 and 54 are connected to the converters 12 and 14 from above by soldering, a conductive adhesive such as silver paste, or an anisotropic conductive adhesive. That is, the converters 12 and 14 are positioned between the FPC 4 and the rear surface of the substrate 2. The FPC 4 is constructed by the aforementioned FPC branches 4a and 4b, and a connection line 4c for connecting with the controller 6.

The connection line 4c and the FPC branch 4a are of the same length, and are formed integrally as a band (refer to FIG. 3). Perforations 56 are formed between the connection line 4c and the FPC branch 4a, to enable separation of the two. An electrode 58, for connecting with the converter 8, is formed at the end of the FPC branch 4a opposite that at which the electrode 52 is provided. An electrode 60, for connecting with the controller 6, is formed at the end of the connection line 4c near the electrode 58. An electrode 62, for connecting with the converter 10, is formed at the end of the FPC branch 4b opposite that at which the electrode 54 is provided (refer to FIG. 3).

As shown in FIG. 4, a printed wiring 64 of the connection line 4c comprises ten printed wires 64a, 64b, 64c, 64d, 64e, 64f, 64g, 64h, 64i, and 64j. A signal wire group is constructed by four printed wires (signal reception wires) 64d, 64e, 64f, and 64g, which are connected to the converters (sensors) 12 and 14. What is important here is that grounding wires 64c and 64h are provided at either side of the signal wire group.

Signal wires 64b and 64i, which are connected to the transmission converters 8 and 10, are provided adjacent to the grounding wires 64c and 64h, respectively. Further, grounding wires 64a and 64j are provided adjacent to the signal wires 64b and 64i, respectively on the outsides thereof. This construction results in shielding of all of the signal wires, by the signal reception wires 64d, 64e, 64f, and 64g being surrounded by the grounding wires 64c and 64h, and the signal transmission wires 64b and 64i being surrounded by the grounding wires 64c and 64a, and the grounding wires 64h and 64j, respectively. This relationship is maintained in the FPC branches 4a and 4b as well. By this construction, the signal wire group consisting of the printed wires 64b, 64d, 64e, 64f, 64g, and 64i are less likely to be influenced by external electromagnetic waves. At the same time, an effect that electromagnetic waves are less likely to be radiated toward the exterior is also obtained. The above construction is particularly effective in improving anti-EMI properties in the case that the FPC 4 is extended over a long distance along the substrate 2.

Note that bending lines of the FPC branch 4b are denoted by reference numerals 66 and 68 in FIG. 4. The FPC branch 4b is bent along the bending line 66 in the direction toward the surface of the drawing sheet of FIG. 4. Then, the FPC branch 4b is bent again along the bending line 68 in the direction away from the surface of the drawing sheet of FIG. 4, so that the electrode 62 (refer to FIG. 3) faces the converter 10. The bending portion is denoted by reference numeral 69 in FIG. 2. In this manner, the FPC branch 4b is arranged along the lateral edge 44 of the substrate 2. Note that the FPC 4 is fixed to the substrate 2 by an adhesive (not shown) or the like.

Figure 5:
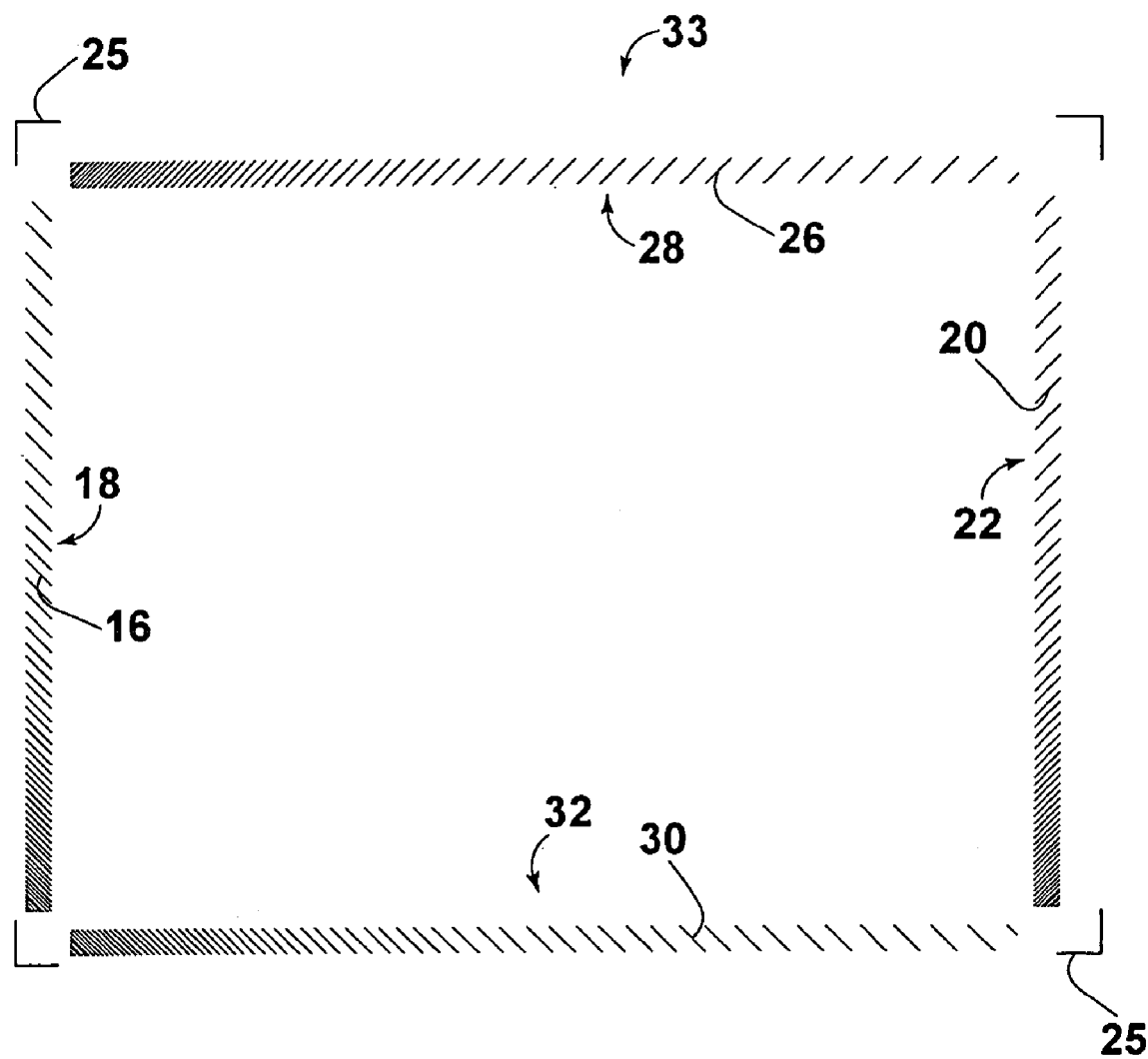
FIG. 5 is a front view of a reflection array, corresponding to that shown in FIG. 1.

Next, the arrangement of the reflection array 33 will be described with reference to FIG. 5. FIG. 5 is a front view of the reflection array 33, corresponding to that shown in FIG. 1. The diffusion gratings 34, 36, 38, and the like for scattering spurious waves are omitted from FIG. 5. Each of the inclined lines 16, 20, 26, and 30 of the reflection arrays 18, 22, 28, and 32 is inclined at an angle of 45°. The inclined lines 16, 20, 26, and 30 are configured to reflect surface acoustic waves toward the reflection array that faces them across the substrate 2. The reflection array 33 is formed by printing fine particles of lead glass formed into a paste on the front surface of the substrate 2 by screen printing or the like, then sintering at approximately 500° C. Note that the corners of the substrate 2 are partially illustrated in FIG. 5, denoted by reference numeral 25. Alternatively, a UV curable organic ink, or an organic ink having metal particles added as filler therein to improve the reflective properties thereof, may be utilized as the material of the reflection array.

The intervals among the inclined lines 16, 20, 26, and 30 decrease, that is, the incline lines are arranged at higher densities, the further they are from the transmission side converters 8 and 10. This is because the intensities of the surface acoustic waves become attenuated as they pass through the inclined lines 16, 20, 26, and 30. Therefore, it becomes necessary to adopt the above construction to compensate for the attenuation to propagate the surface acoustic waves evenly along the front surface of the substrate 2. Note that the reflection arrays 22 and 28 are provided slightly inward from the upper edge 24 and the lateral edge 44 (refer to FIG. 1) of the substrate, respectively. This is so that the inclined lines 40, 42, 46, and 48 of the diffusion grating 50, to be described later, may be provided at the outsides of the reflection arrays 22 and 28.

Figure 6:
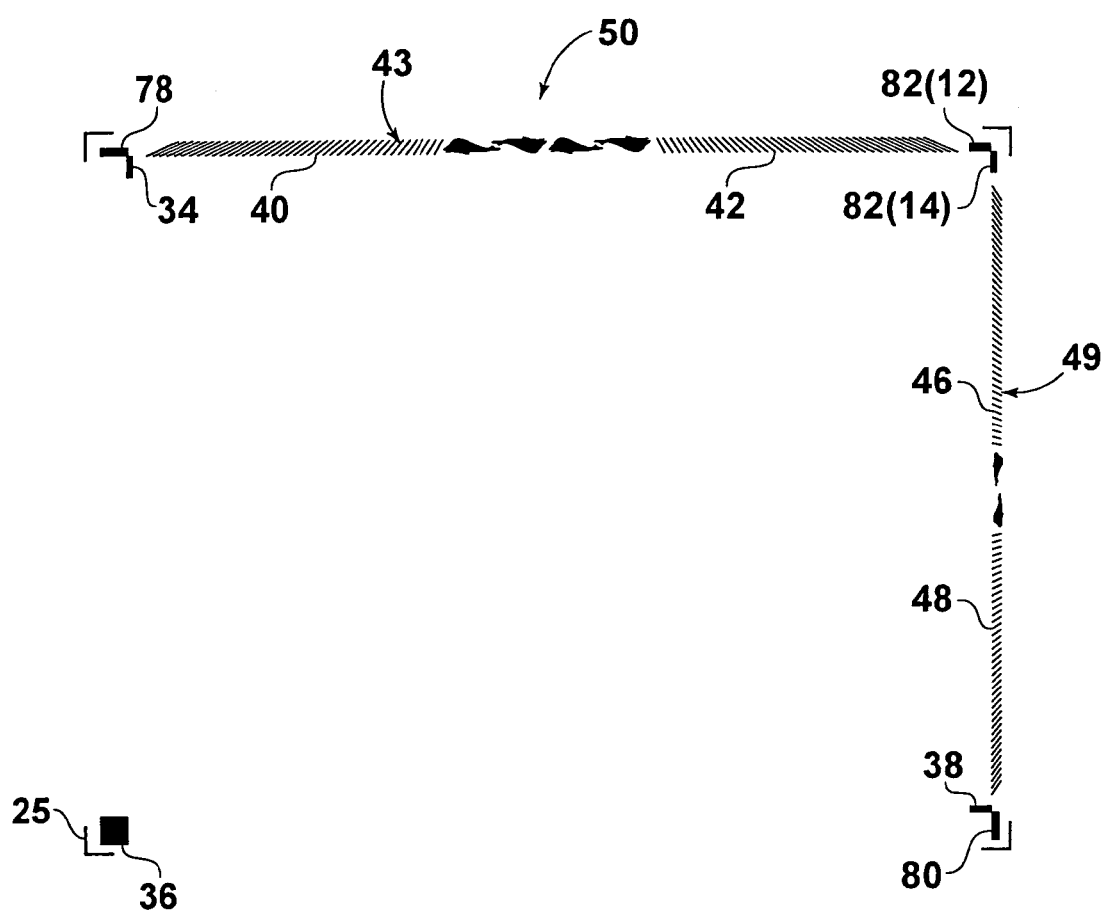
FIG. 6 is a front view of mode converting elements and a diffusion grating, corresponding to that shown in FIG. 1.

Next, the diffusion grating 50, which functions as a spurious wave scattering means, will be described with reference to FIG. 6. FIG. 6 is a front view, corresponding to FIG. 1, that shows the diffusion grating 50 along with the mode converting elements 78, 80, 82, and 84. The inclined lines 40 and 42, which constitute the second reflection array, are formed at opposite angles with respect to each other in the vicinity of the upper edge 24 of the substrate 2. The angles of the inclined lines are such that they are close to perpendicular toward the central portion of the substrate 2, and gradually decrease toward the edges thereof. In a similar manner, the other inclined lines 46 and 48, which constitute the second reflection array, are formed at opposite angles with respect to each other, with gradually changing angles. This is so that spurious waves are not reflected in the same direction, but rather are diffused.

The inclined lines 40, 42, 46, and 48 are positioned at regions where tape and the like are adhered to in conventional touch panels. That is, the inclined lines 40, 42, 46, and 48 are formed to replace the tape of conventional touch panels. The spurious waves that reach these regions are diffusively reflected by the inclined lines 40, 42, 46, and 48, so that they are not propagated to the converters (sensors) 12 and 14. The attenuation rate of ultrasonic vibration energy differs according to the frequency of the ultrasonic waves, the vibration mode, and the type of glass. The intensity of surface acoustic waves at a frequency of 5.5 MHz attenuates to $\frac{1}{10}$ its original intensity after propagating 40 cm along a typical substrate 2 formed of soda lime glass. Accordingly, the diffusively reflected spurious waves attenuate rapidly and disappear as they are reflected across the substrate 2.

Figure 7:
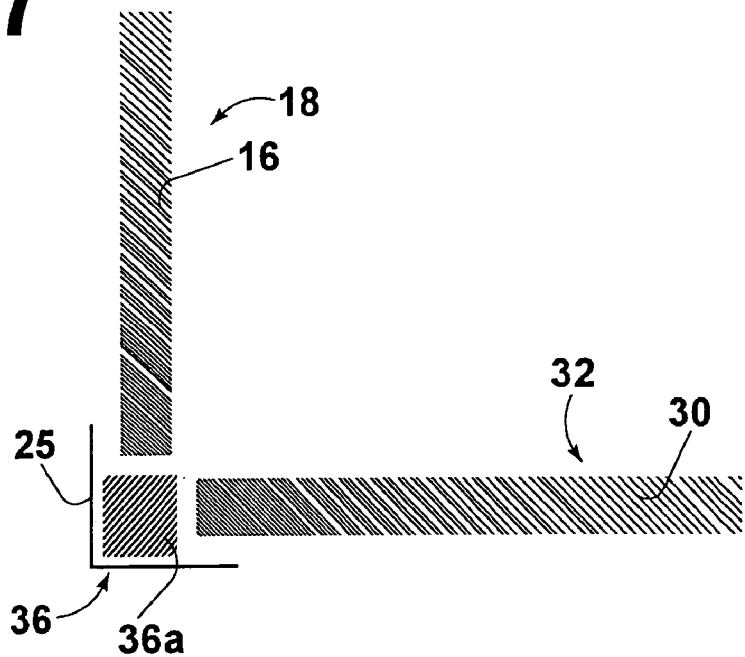
FIG. 7 is a partial magnified view of the reflection array and the diffusion grating.
Figure 8:
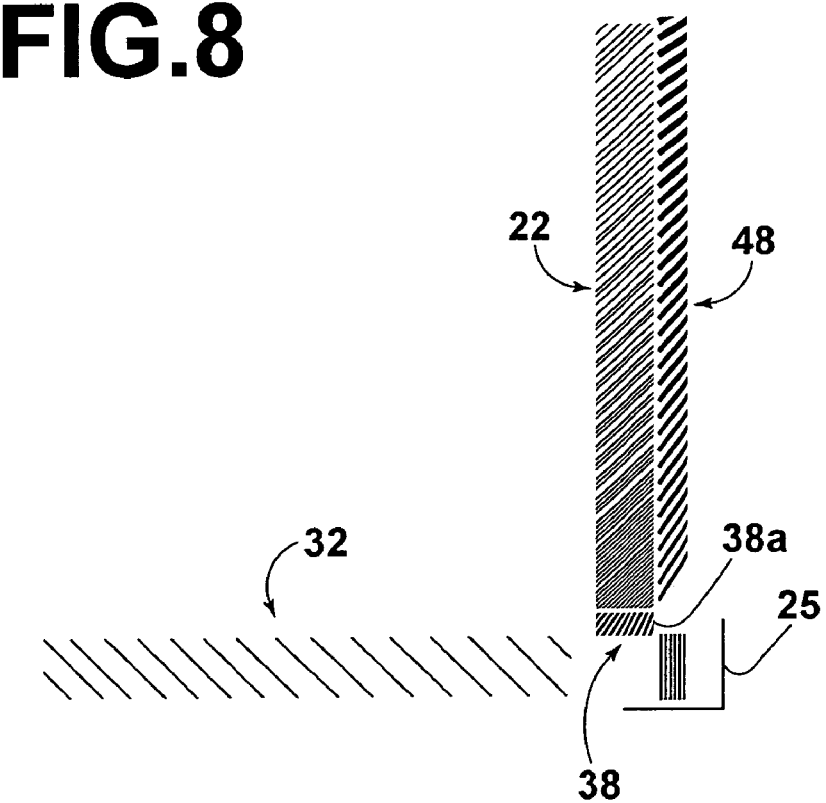
FIG. 8 is another partial magnified view of the reflection array and the diffusion grating.

A plurality of separate ridges, that is, inclined lines, inclined at angles other than 45° or −45°, are formed at the rectangular diffusion gratings 34, 36, and 38. The shapes of the ridges will be described with reference to FIG. 7 and FIG. 8. FIG. 7 is a partial magnified view of the diffusion grating 36 and the reflection array 33. FIG. 8 is a partial magnified view of the diffusion grating 38 and the reflection array 33. It is clearly shown in FIG. 7 that inclined lines 36a of the diffusion grating 36 are oriented at angles different from those of the reflection arrays 18 and 32. Likewise, FIG. 8 clearly shows the diffusion grating 38, which is constituted by steeply inclined lines 38a.

These diffusion gratings 36 and 38 also function to diffusively reflect spurious waves that propagate along the front surface of the substrate 2 toward the exterior, at angles other than 45° or −45°. The diffusion grating 34, although not illustrated in detail, possesses a similar structure and function. The inclined lines 36a and 38a may be parallel or have gradually changing angles within the respective diffusion gratings 36 and 38. The diffusion gratings 34 and 38 also function to block the paths of surface acoustic waves that propagate in directions other than a predetermined direction, so that they do not reach the converters (sensors) 12 and 14.

The diffusion grating 50 is printed on the substrate 2 by lead glass particles formed into a paste, in the same manner as the reflection array 33. Accordingly, the diffusion grating 50 may be printed at the same time that the reflection array 33 is formed. This improves productivity and reduces manufacturing costs.

Figure 9:
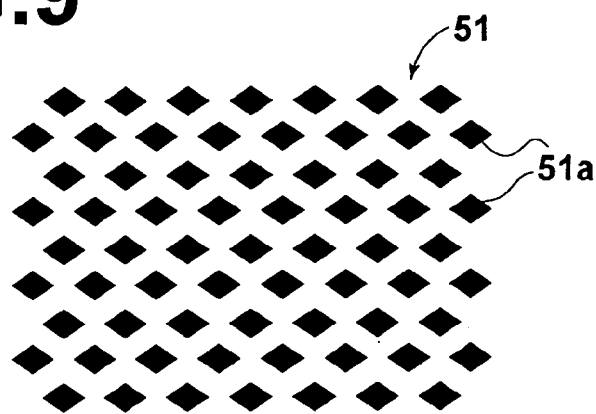
FIG. 9 is a magnified view of an alternate form of the diffusion grating.

The inclined lines 36a and 38a of the diffusion gratings 36 and 38 are formed as a plurality of ridges. However, the diffusion gratings are not limited to being formed by ridges, and various modifications are possible. An alternate construction of the diffusion grating (diffusing portion) is shown in FIG. 9. FIG. 9 is a magnified view of an alternate form of the diffusion grating (diffusing portion). This diffusing portion 51 is constructed by a great number of protrusions 51a, which are diamond shaped in plan view. Spurious waves that reach the diffusing portion 51 are attenuated while being repetitively reflected by the protrusions 51a within the region formed thereby. The shape of the protrusions is not limited to a diamond shape, and may be any desired shape, such as rectangles, triangles, other polygonal shapes, or ovals.

Figure 10:
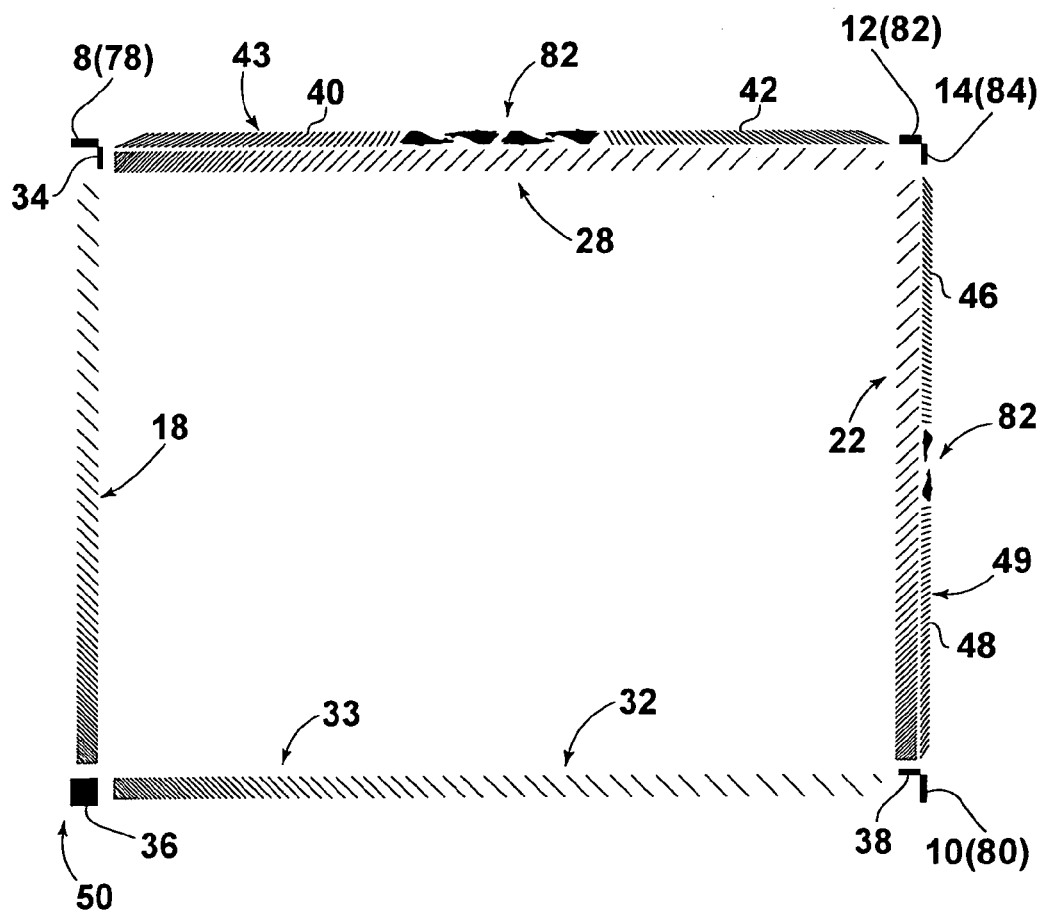
FIG. 10 is a front view illustrating the relative positions of the diffusion grating and the reflection array.

FIG. 10 is a front view illustrating the relative positions of the diffusion grating 50 and the reflection array 33, formed on the front surface of the substrate 2. FIG. 10 clearly illustrates that the inclined lines 40 and 42 are positioned outside the reflection array 28, and that the inclined lines 46 and 48 are positioned outside the reflection array 22. The diffusion gratings 34, 36, and 38 are positioned so that acoustic waves (surface acoustic waves), which pass through the reflection array 33 without being reflected, are reflected in directions different from those in which the reflection array 33 reflects them.

More specifically, for example, surface acoustic waves generated by the converter 8 and the mode converting element 78 are reflected toward the reflection array 22 by the reflection array 18 while passing therethrough. The surface acoustic waves which are not reflected by the reflection array 18 reach the diffusion grating 36. As shown in FIG. 7, the diffusion grating 36 functions to reflect surface acoustic waves toward the outside of the substrate 2. That is, the diffusion grating 36 reflects the surface acoustic waves in the opposite direction from the primary direction, so that ultrasonic vibrations that would cause noise do not reach the converter (sensor) 12.

The inclined lines 40, 42, 46, and 48 formed along the edges of the substrate 2 are structured to diffusively reflect and attenuate bulk waves that propagate along the front surface of the substrate 2. Normally, bulk waves are converted to surface acoustic waves by the mode converting elements 78 and 80. However, bulk waves which are not 100% converted propagate in directions other than the predetermined directions therefor. Therefore, the inclined lines 40, 42, 46, and 48 are utilized to attenuate these spurious bulk waves.

In addition, surface acoustic waves propagate in directions other than the predetermined directions therefor after being converted by the mode converting elements 78 and 80. The inclined lines 40, 42, 46, and 48 also diffusively reflect these stray surface acoustic waves so that they are scattered in various directions. The risk that spurious ultrasonic vibrations reach the converters (sensors) 12 and 14 to cause noise is reduced by this diffusive reflection.

Pictures 82 of dolphins are printed between the inclined lines 40 and 42, and also between the inclined lines 46 and

48 in FIG. 10. The pictures 82 are also effective in reducing noise. The pictures 82 have curved outlines. Bulk waves or stray surface acoustic waves that reach the outlines of the pictures 82 are reflected in various directions and attenuated. Any picture may be employed as long as the outline thereof is formed of curved lines, or are of angles that cause spurious waves to be diffusively reflected in various directions. Alternatively, patterns may be printed on the substrate 2 at these portions.

An embodiment of the present invention has been described in detail above. However, the present invention is not limited to the embodiment described above. For example, the diffusion grating 50 may be formed by etching with hydrofluoric acid. The diffusion grating 50 may also be formed by a chemical or physical removal process employing lasers, sandblasting, or cutting. In other words, the diffusion grating 50 may be formed by grooves instead of protrusions.

In the present embodiment, the case in which surface acoustic wave generating means of the so-called "grating type", which have mode converting elements 78, 80, 82, and 84, are employed has been described. However, the present invention is not limited to apparatuses that employ this type of surface acoustic wave generating means. For example, the present invention may be applied to an acoustic wave contact detecting apparatus that generates surface acoustic waves by means of a wedge type converter (not shown) that utilizes an acrylic prism (not shown). The present invention may also be applied to an acoustic wave contact detecting apparatus that employs a pair of comb electrodes formed on an ultrasonic vibrator, without a grating nor a wedge.

The FPC 4 which is utilized in the present invention may be adhesively attached to the substrate 2 with any desired adhesive. However, it is preferable that piezoelectric vibrators be adhesively attached using ultraviolet cured adhesive. This is to enable adjustment of the positions of the converters 8, 10, 12, and 14 with respect to the mode converting elements 78, 80, 82 and 84 to confirm optimal generation of surface acoustic waves prior to irradiation of ultraviolet rays, which causes adhesion.

The spurious wave scattering means may be of the type that causes diffusive reflection and attenuation, as described above. Note that the two converters (sensors) 12 and 14 are provided in close proximity to each other in the embodiments described above. However, the converters (sensors) 12 and 14 may switch places with the transmission converters 8 and 10, so that they are positioned apart from each other. In this case, when surface acoustic waves leak from either the converter 12 or 14, as the other converter 14 or 12 is not in close proximity therewith, the noise picked up by the other converter is suppressed. In addition, the electrical path from the controller 6 to the transmission converters 8 and 10 can be reduced. Therefore, spurious radiation, that is, emission of electromagnetic waves, from the electrical path, can be suppressed.

Next, other embodiments of the spurious wave scattering means for attenuating and eliminating spurious waves in the same manner as described above will be described. Note that in the following description, cases will be described in which the spurious wave scattering means are formed with high production efficiency, by printing glass particles formed into a paste, simultaneously with reflection arrays. However, a chemical or physical removal process for forming grooves, such as etching with hydrofluoric acid, a process employing lasers, sandblasting, or cutting may be employed.

Figure 12:
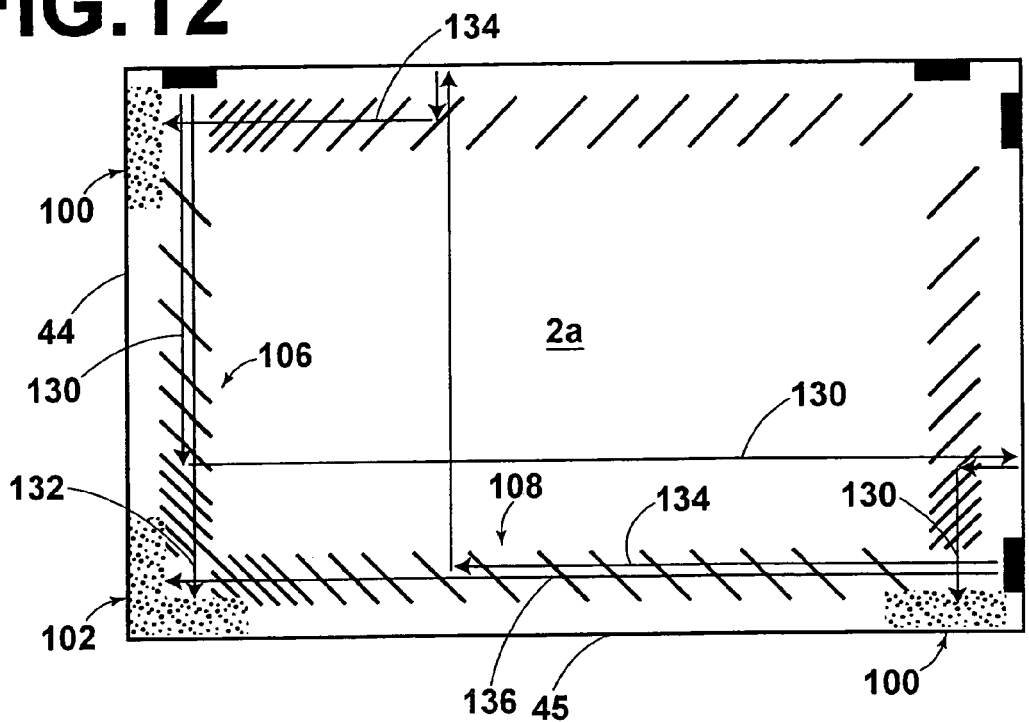
FIG. 12 is a front view of a substrate on which a spurious wave scattering means for randomly scattering and eliminating spurious waves has been formed.
Figure 13:
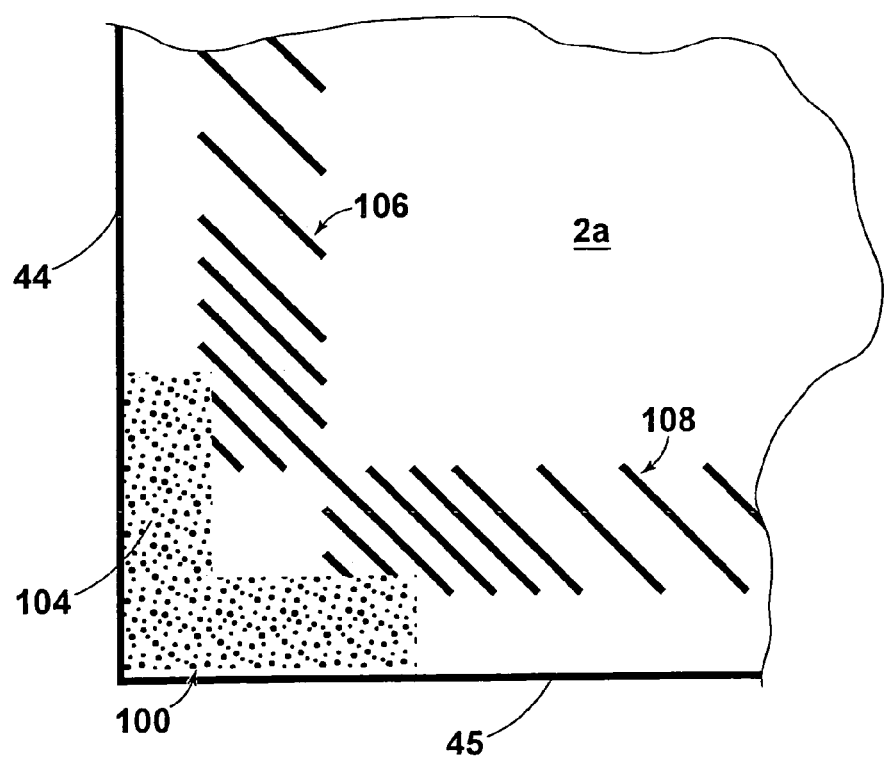
FIG. 13 is a partial magnified view of a region at which the spurious wave scattering means is formed on the substrate of FIG. 12.
Figure 14:
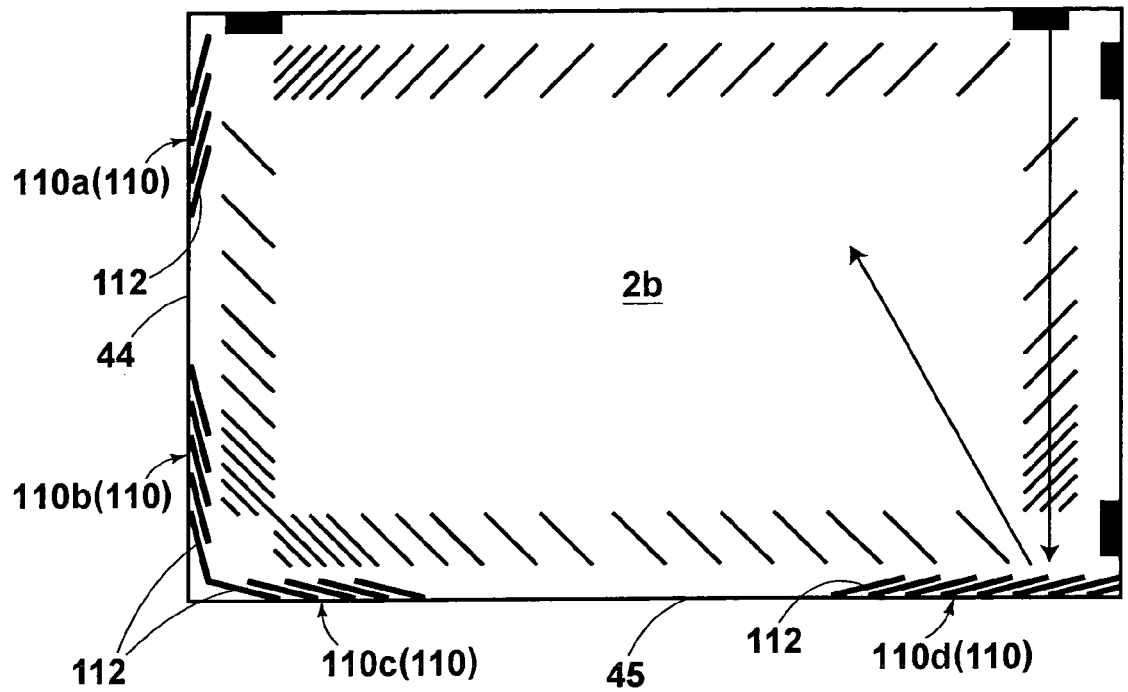
FIG. 14 is a front view of a substrate with another embodiment of a spurious wave scattering means.
Figure 15:
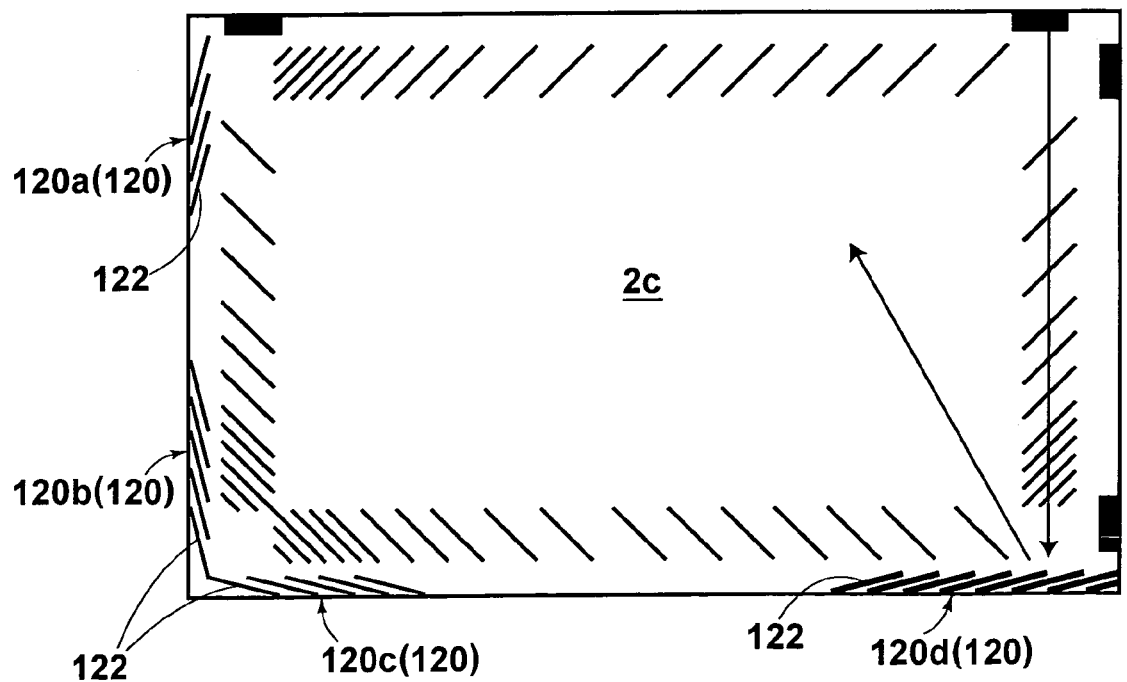
FIG. 15 is a front view of a substrate on which a spurious wave scattering means similar to that of FIG. 14 is formed.

FIG. 12 is a front view of a substrate on which a spurious wave scattering means of a second embodiment, for randomly scattering and eliminating spurious waves, has been formed. FIG. 13 is a partial magnified view of a region at which the spurious wave scattering means is formed on the substrate of FIG. 12. FIG. 14 is a front view of a substrate with a third embodiment of a spurious wave scattering means. FIG. 15 is a front view of a substrate on which a spurious wave scattering means of a fourth embodiment, similar to that of FIG. 14, is formed. Note that FIG. 12, FIG. 13, FIG. 14, and FIG. 15 illustrate modifications of the (touch panel) apparatus shown in FIG. 1, wherein the diffusion gratings 34, 36, and 38 have been replaced by the spurious wave scattering means of the second, third and fourth embodiments. The other structures are common through the three embodiments, therefore the same structures are denoted by the same reference numerals, and descriptions thereof are omitted. Note also that in FIG. 12 through FIG. 15, only the parts of importance are illustrated, and other portions are omitted.

1. Eliminating Spurious Waves by Random Scattering

As an example, a case in which fine protrusions are randomly distributed (by the aforementioned printing method) on a substrate to form a spurious wave scattering means will be described. Note that as stated above, depressions may be formed by a chemical or physical grooving process (holing process) instead of the fine protrusions.

As shown in FIG. 12 and FIG. 13, diffusing portions 100 and 102, as spurious wave scattering means, are formed on a substrate 2a at the lateral edge 44, the lower edge 45, and the corner thereof. The diffusing portions 100 are rectangular in shape and extend along the lateral edge 44 and the lower edge 45. The diffusing portion 102 is formed in an L shape at the corner. All of the diffusing portions 100, 100, and 102 are positioned outside reflection arrays 106 and 108. A great number of diffusing protrusions 104 are randomly distributed, that is, without regularity, within the diffusing portions 100, 100, and 102. The shapes of the diffusing protrusions 104 are rectangular in plan view. However, the diffusing protrusions 104 are not limited to being rectangular, and may be any desired shape, such as circles, ovals or polygons. The diffusing protrusions 104 may be of the same size, or each diffusing protrusion 104 may be of a different size and shape. Here, the distribution of the diffusing protrusions 104 is set so that spurious waves (for example, parasitic echoes) are sufficiently scattered and eliminated (so that they are not detected by sensors as noise).

The manner in which the diffusing portions 100, 100 and 102, which are groups of the diffusing protrusions 104, scatter and eliminate spurious waves which are propagated along the surface of the substrate 2a is the same as in the embodiment described above. Therefore, a detailed description will be omitted. Note that paths 130, 132, 134, 136, along which spurious waves travel until they are eliminated, are shown in. FIG. 12.

2. Eliminating Spurious Waves by Coherent Scattering

In the method wherein a spurious wave scattering means and a reflection array are simultaneously formed on a substrate by printing glass particles in paste form, it is necessary for the heights of the ridges of the spurious wave scattering means and the inclined lines of the reflection array to substantially match (for example, at heights of 5 μm to 10 μm). Further, attenuation and elimination of spurious waves within a limited area is desired. In this case, the attenuation and elimination of spurious waves can be more effectively performed by forming diffusion gratings that generate a coherent scattering effect.

Here, it is known that the frequency and wavelength of spurious waves, which are emitted from a converter and propagate through the substrate are 5.5 MHz and approximately 570 μm (in the case of a soda glass substrate), respectively. Advantage is taken of these facts.

As shown in FIG. 14, diffusion gratings 110a and 110b are formed along the lateral edge 44 of a substrate 2b. Diffusion gratings 110c and 110d are formed along the lower edge 45 of the substrate 2b. Note that the diffusion gratings 110a, 110b, 110c, and 110d will collectively be referred to as a diffusion grating 110. The diffusion grating 110 are provided in the vicinity of the edges of the substrate 2b opposite the mode converting elements 78, 80, 82, and 84. The diffusion grating 110 comprises outwardly inclined lines 112 similar to the diffusion gratings 43 and 49. The inclined lines 112 are provided parallel to each other, and the inclination angles thereof are smaller than those of the diffusion gratings 43 and 49. By this arrangement of the inclined lines 112, the diffusion grating 110 functions to scatter and eliminate spurious waves by coherent scattering of Rayleigh waves (surface acoustic waves). That is, the Rayleigh waves are scattered and eliminated while interfering with each other.

3. Eliminating Spurious Waves by Converting Rayleigh Waves to Bulk Waves by Coherent Scattering The elimination of spurious waves by coherent scattering described under heading 2 above does not convert Rayleigh waves (surface acoustic waves), which have become spurious waves, to Rayleigh waves of a different form. However, a method wherein Rayleigh waves (surface acoustic waves) are converted to bulk waves, from which components that vibrate perpendicular with respect to the surface of a substrate are removed, is also effective.

That is, the propagating directions of spurious waves are changed or scattered, and changed to bulk waves that propagate while bouncing between the front and the rear surfaces of the substrate. Bulk waves, unlike surface acoustic waves, do not travel at great speed along horizontal surfaces, nor do they travel for great distances. Therefore, spurious waves can be more quickly attenuated and eliminated. The conversion of surface acoustic waves to bulk waves is referred to as "coalescing Rayleigh waves to Lamb mode" in the field of acoustics.

A diffusion grating 120 (120a, 120b, 120c, and 120d) formed on a substrate 2c as shown in FIG. 15 is similar to the diffusion grating 110 (refer to FIG. 14) for eliminating spurious waves by coherent scattering described under heading 2 above. However, the intervals between inclined lines that constitute the diffusion gratings and the widths of the inclined lines differ therefrom. In addition, the orientations (angles) of the inclined lines may be the same as those of the inclined lines 112, or they may be different.

As described above, various constructions may be applied as the spurious wave scattering means for scattering and eliminating spurious waves.

Note that in the embodiments described above, Flexible Printed Circuits (FPC's) are employed as the wiring of the electric circuits mounted on the substrates. However, Flexible Flat Cables (FFC's)may alternatively be employed as the wiring.

What is claimed is:

1. An acoustic wave contact detecting apparatus comprising:
   a substrate having a surface along which acoustic waves propagate;
   a mode converting element;
   a reflection array for causing the generated acoustic waves to propagate along the surface of the substrate;
   a detector for detecting changes in the acoustic wave caused by an object contacting the surface of the substrate; and
   a controller for determining the geometric coordinates of the object; wherein:
   a diffusing portion for diffusing spurious waves, which are generated accompanying the generation of the acoustic waves, is formed on the substrate, the diffusing portion comprising a plurality of substantially parallel inclined lines, which are densely distributed in the vicinity of an edge of the substrate opposite that at which the mode converting element is provided.

2. An acoustic wave contact detecting apparatus as defined in claim 1, wherein:
   the diffusing portion is formed of the same material as that of the substrate.

3. An acoustic wave contact detecting apparatus as defined in claim 1, wherein:
   the mode converting elements and the diffusing portion are formed by printing.

4. An acoustic wave contact detecting apparatus as defined in claim 1, wherein:
   the mode converting elements and the diffusing portion are formed by etching.

* * * * *